(12) United States Patent
Silver et al.

(10) Patent No.: US 6,690,842 B1
(45) Date of Patent: *Feb. 10, 2004

(54) APPARATUS AND METHOD FOR DETECTION AND SUB-PIXEL LOCATION OF EDGES IN A DIGITAL IMAGE

(75) Inventors: William Silver, Weston, MA (US); Arman Garakani, Wellesley, MA (US); Aaron Wallack, Natick, MA (US)

(73) Assignee: Cognex Corporation, Natick, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/114,357

(22) Filed: Apr. 2, 2002

Related U.S. Application Data (63) Continuation of application No. 08/727,721, filed on Oct. 7, 1996, now Pat. No. 6,408,109.

(51) Int. Cl.[7] .................................................. G06L 9/32
(52) U.S. Cl. .................................... 382/300; 382/199
(58) Field of Search ................................ 382/263, 266, 382/269, 199, 189, 190, 203, 281, 300

(56) References Cited

U.S. PATENT DOCUMENTS

| | | | |
|---|---|---|---|
| 4,499,598 A | | 2/1985 | Chuttineni |
| 5,054,100 A | | 10/1991 | Tai |
| 5,212,740 A | | 5/1993 | Paek et al. |
| 5,392,365 A | | 2/1995 | Steinkirchner |
| 5,398,292 A | | 3/1995 | Aoyama |
| 5,602,942 A | | 2/1997 | Takemoto et al. |
| 5,692,072 A | | 11/1997 | Hashimoto |
| 5,694,487 A | | 12/1997 | Lee |
| 5,754,710 A | | 5/1998 | Sekine et al. |
| 5,940,538 A | | 8/1999 | Spiegel et al. |
| 6,005,978 A | | 12/1999 | Garakani |
| 6,408,109 B1 | * | 6/2002 | Silver et al. ............... 382/300 |

OTHER PUBLICATIONS

A. Ikonomopoulos, An Approach to Edge Detection Based on the Direction of Edge Elements, Computer Graphics and Image Processing, pp. 179–195, Academic Press, Inc., 1982.

(List continued on next page.)

*Primary Examiner*—Timothy M. Johnson
*Assistant Examiner*—Sheela Chawan
(74) *Attorney, Agent, or Firm*—Russ Weinzimmer (57) ABSTRACT

The invention provides a fast, computationally inexpensive, and highly accurate method and apparatus for edge detection in a digital image, even for edges that are not substantially parallel to the axes of the pixel grid, by exploiting computationally inexpensive estimates of gradient magnitude and direction. In particular, the method includes the steps of: estimating gradient magnitude and direction at a plurality of regularly-spaced pixel points in the image so as to provide a plurality of estimates of gradient magnitude and direction, each such estimate being associated with a respective gradient point of a regularly-spaced gradient grid; using gradient direction associated with each gradient point to select a respective set of neighboring gradient points; comparing gradient magnitude associated with each gradient point with each gradient magnitude of the respective set of neighboring gradient magnitudes so as to determine which of the gradient magnitudes is a local maximum in approximately the gradient direction; and using the local maximum of gradient magnitude and a set of neighboring gradient magnitudes to determine an interpolated edge position along a one-dimensional gradient magnitude profile. Another aspect of the invention for providing two-dimensional edge position interpolation further includes the step of determining a plane position line normal to the gradient direction of a gradient point associated with the local maximum of gradient magnitude, the plane position line also passing through the interpolated edge position, along which plane position line at least one two-dimensional interpolated position of the edge can be determined.

33 Claims, 7 Drawing Sheets

OTHER PUBLICATIONS

S. Kirmura and S. Ozawa, A Method for Subpixel Address Generation, Transactions of the Institute of Electronics, Information and Communication enginneers D–II, vol. J72D–II, No. 5, pp. 831–833, Japan, May 1989.

J. S. Chen and G. Medioni, Detection, Localization, and Estimation of Edges, IEEE Transactions on Pattern Analysis and Machine Intelligence, vol. II, No. 2, Feb., 1989.

Hin Leong Tan, Saul B. Gelfand and Edward J. Delp, A Cost Minimization Approach to Edge Detection Using Simulated Annealing, IEEE Transactions on Pattern Analysis and Machine Intelligence, vol. 14, No. 1, Jan. 1991.

Ali J. Tabatabai and O. Robert Mitchell, IEEE Transactions on Pattern Analysis and Machine Intelligence, vol. PAMI–6, No. 2, Mar. 1984.

Todd Law, Hidenori Itoh and Hirohisa Seki, IEEE Transactions on Pattern Analysis and Machine Intelligence, vol. 18, No. 5, May 1996.

P.J. MacVicar–Whelan and T.O. Binford, Line Finding with Subpixel Precision, SPIE vol. 281 Techniques and Applications of Image Understanding, pp. 211–216, 1981.

Vishvjit S. Nalwa and Thomas O. Binford, On Detecting Edges, IEEE Transactions on Pattern Analysis and Machine Intelligence, vol. PAMI–8, No. 6, Nov., 1986.

K. Raghunath Rao and Jexekiel Ben–Arie, Optimal Edge Detection Using Expansion Matching and Restoration, IEEE Transactions on Pattern Analysis and Machine Intelligence, vol. 16, No. 12, Dec., 1994.

Maria Petrou and Josef Kittler, Optimal Edge Detectors for Ramp Edges, IEEE Transactions on Pattern Analysis and Machine Intelligence, vol. 13, No. 5, May 1981.

Sudeep Sarkar, and Kim L. Boyer, On Optimal Infinite Impulse Response Edge Detection Filters, IEEE Transactions on Pattern Analysis and Machine Intelligence, vol. 13, No. 11, Nov., 1981.

Edward P. Lyvers and O. Robert Mitchell, Precision Edge Contrast and Orientation Estimation, IEEE Transactions on Pattern Analysis and Machine Intelligence, vol. 10, No. 6, Nov., 1988.

Yi Lu and Ramesh C. Jain, Reasoning about Edges in Scale Space, IEEE Transactions on Pattern Analysis and Machine Intelligence, vol. 14, No. 4, Apr. 1992.

Edward P. Lyvers, Owen Robert Mitchell, Mark L. Akey and Anthony P. Reeves, Subpixel Measurements Using a Moment–Based Edge Operator, IEEE Transactions on Pattern Analysis and Machine Intelligence, vol. 11, No. 12, Dec. 1989.

Vinciane Lacroix, A Three–Module Strategy for Edge Detection, IEEE Transactions on Pattern Analysis and Machine Intelligence, vol. 10, No. 6, Nov. 1988.

Ramesh Jain, Rangachar Kasturi and Brain G. Schunck, Edge Detection, Machine Vision, Chapter 5, pp. 140–181, McGraw–Hill, Inc., 1995.

Peter Rockett, *The accuracy of Sub–Pixel Localisation in the Canny Edge Detector*,Department of Electronic & Electrical Engineering, University of Sheffield, Sheffield S1 3JD, UK.

Charlie Rothwell, Joe Mundy, Bill Hoffman, Van–Due Nguyen, *Driving Vision by Topology*, Inria, Institut National De Recherche En Informatique Et En Automatique, Decembre 1994, Programme 4, Sophia–Antipolis Cedex (France).

Frédéric Devernay, *A Non–Maxima Suppression Method for Edge Detection with Sub–Pixel Accuracy*, Inria, Institut National De Recherche En Informatique Et En Automatique, Novembre 1995, Programme 4, Sophia–Antipolis Cedex (France).

John Canny, *A Computational Approach to Edge Detection*, IEEE, 1986.

Ali J. Tabatabai, O. Robert Mitchell, *Edge location to Subpixel Values in Digital Imagery*, IEEE Transactions on Pattern Analysis and Machien intelligence, vol. PAMI–6, No. 2, Mar. 1984.

David Young, *Gaussian Masks, Scale Space and Edge Detection*, University of Sussex, Jan. 1993, revised Jan. 1994.

Edges: The Canny Edge Detector, http://www.isbe.man.ac.uk/public_vxl_doc/contrib/oxl/osl/html/osl_edge_detector_8c xx–source.html, 1986.

Joe Mundy, Peter Vanroose, Andrew Fitzgibbon, TargetJr User's Guide http://www.esat.kuleuven.ac.be/~targetjr/GE_mirror/intro.html.

vxl/TargetJr standard software platform http://www.esat-.kuleuven.ac.be/~targetjr/.

Charlie Rothwell, *Canny –a class for strict Canny edge detection*, GE Corporate Research and Development, 1992; http://foto.hut.fi/research/TargetJr/Manpages/Segmentation/Detection/Canny.html.

PH. Bolon, J.–M. Chassery, J.–P. Cocquerez, D. Demigny, C. Graffigne, A. Montanvert, S. Philipp, R. Zéboudj, J. Zérubia, *Analyse d'images: filtrage et segmentation*, Masson Editeur, Paris, 1995.

John Francis Canny, *Finding Edges and Lines in Images*, MIT Artificial Intelligence Laboratory, Technical Report 720, Jun. 1983.

oxl/osl/osl_edge_detector http://216.239.53.104/search!q=cache:HTsSKx0M55AC:www.isbe.man.ac.uk/public_vx I_doc/contrib/oxl/osl/html/osl_edge_detector_8h–source-.html+oxl/osl/osl_edge_detector.h&hl=en&ie=UTF–8.

C:/MATLABR11/toolbox/images/edge.m Unknown source; Jan 29, 1999.

* cited by examiner

APPARATUS AND METHOD FOR DETECTION AND SUB-PIXEL LOCATION OF EDGES IN A DIGITAL IMAGE

This is a continuation of application Ser. No. 08/727,721 filed Oct. 7, 1996, now U.S. Pat. No. 6,408,109.

FIELD OF THE INVENTION

This invention relates generally to digital image processing, and particularly to edge detection in digital images.

BACKGROUND OF THE INVENTION

Digital images can be formed by many devices and can be used for many practical purposes. Digital image formation devices include TV cameras operating on visible or infrared light, line-scan sensors, flying spot scanners, electron microscopes, X-ray devices, such as CT scanners, and magnetic resonance imagers, for example. Practical applications of digital image formation devices include industrial automation, medical diagnosis, satellite imaging, photographic processing, surveillance, traffic monitoring, document processing, and many others.

To serve these applications, images formed by a digital image formation device are processed by a digital information processing device, such as a general purpose computer executing image processing software, to extract useful information. One very common form of digital image processing, well known in the art, is edge detection. Edge detection can be defined informally as a process for determining the location of boundaries between image regions that are of different and roughly uniform brightness. To be more precise, edge detection can be defined as a process for locating edges in an image, where an edge can be usefully defined as a point in an image where the image gradient magnitude reaches a local maximum in the image gradient direction, or equivalently, where the second derivative of brightness crosses zero in the image gradient direction. It can also be useful to define an edge as a point where the image best fits a one- or two-dimensional ideal step boundary, within a small neighborhood of the point. (Some authors define an edge to be a set of such points, and define the points themselves as edge elements. For present purposes, the distinction is unnecessary; the points will simply be called edges.)

It is recognized in the art that many local maxima of gradient magnitude (or zero-crossings in the second derivative) may exist in an image that are not the result of boundaries between regions, but rather are the result of image noise or other image artifacts. Thus, it is conventional to discard edge points whose gradient magnitude is less than some noise threshold, which threshold can be predetermined, or can be adaptively computed based on image characteristics, and which can vary from point to point in the image, or can be constant over the entire image. Other more sophisticated edge point filtering techniques are known in the art, such as the hysteresis thresholding method of Canny.

It is also recognized in the art that the existence and characteristics of a boundary between regions of different and roughly uniform brightness depends on the scale (resolution) at which the image is processed. Boundaries between small, high spatial frequency regions may not be evident in a coarse, low resolution examination of the image, while boundaries between much larger, low spatial frequency regions may not be evident in a fine, high resolution view (i.e., not seeing the forest for the trees). Thus it is known in the art to perform edge detection at a plurality of spatial frequencies or length scales as appropriate to the application.

The above definition of an edge based on gradient magnitude and direction, while precise, is based on the impractical assumption that an image can be treated as a function of two continuous variables. In practice, however, an image acquired by an image formation device as discussed above is discontinuous and quantized, consisting of an array of pixels, each pixel being disposed at an integer-valued image coordinate, and each pixel having an integer brightness values. Consequently, in practice one can only estimate gradient magnitude and gradient direction, and one can only estimate the position of a gradient maximum or a zero-crossing. Furthermore, in practice, the computational cost and speed of such an estimation must be considered, so that it is desirable to use methods of gradient estimation that are accurate, and yet at the same time computationally inexpensive and fast. However, higher accuracy gradient determination, and edge location based thereon, is typically associated with high cost and/or low speed. Also, low cost and/or high speed gradient determination, and edge location based thereon, is typically associated with low accuracy. Many estimators of gradient magnitude and direction are known in the art, which attempt to strike a reasonable balance between accuracy, computational cost, and speed.

To provide low cost and/or high speed, most known gradient estimators provide very crude estimates of gradient magnitude and direction. In this case, the gradient magnitude accuracy tends to be less for gradient directions not substantially parallel to the axes of the pixel grid, as compared with gradient magnitude accuracy for gradient directions substantially parallel to the axes of the pixel grid. Gradient direction is usually computed to only three bits of precision (i.e., approximated to one of eight discrete directions, e.g., N, NE, E, . . . ) because three-bit accuracy is relatively inexpensive; cost increases significantly beyond three bits.

Although carrying out edge detection to the nearest whole pixel using image gradients is generally straightforward and efficient, it is challenging to achieve fast, inexpensive, and accurate subpixel edge detection using image gradients. Alternatively, edge detection based on locally fitting ideal step boundaries can directly provide accurate subpixel edge positions, without requiring intermediate calculations based on an assumption of two continuous variables. Therefore, such local fitting methods dominate the art in applications requiring accurate, subpixel edge detection. However, local fitting methods are relatively expensive and/or slow, and therefore are not practical in high-accuracy applications that also require low cost and/or high speed. Consequently, there is a need for an inexpensive and/or fast method of high-accuracy subpixel edge detection.

SUMMARY OF THE INVENTION

The invention provides an apparatus and method for accurate subpixel edge detection, based on fast and inexpensive estimates of image gradient magnitude and direction. Any method of forming an image may be used, based on either image acquisition using an image formation device, or image synthesis. In either case, the image may optionally be transformed by one or more processing steps of any nature, including but not limited to optical and/or electronic image processing.

The invention provides a method and apparatus for edge detection using an array of gradient magnitude and gradient direction estimates to determine accurate subpixel positions of the edges detected.

Image gradient magnitude and direction are estimated at regularly spaced positions in the image using any gradient estimation method that provides more than three bits of gradient direction accuracy, including but not limited to the gradient estimation method described herein. In a preferred embodiment, an inexpensive gradient estimator providing around seven bits or more of magnitude and direction is used. The estimates are made at a scale (spatial resolution) appropriate to the application. The edge detection process can be performed at a plurality of scales on the same image, if appropriate. The points at which gradient is estimated at a given scale may or may not correspond to the locations of the image pixels.

In an optional step, a gradient estimate is discarded when it is determined not to correspond to a real image feature, using methods known in the art, such as discarding the gradient estimate when the magnitude of the gradient estimate falls below a noise threshold. This optional step may be performed separately, or may be combined with subsequent processing steps.

For each gradient estimate G, having magnitude $G_0$ and direction $G_\theta$, one or more neighboring estimates are chosen on each side of G, approximately along the direction $G_\theta$. In a preferred embodiment, where the estimates lie on a square grid, one neighbor on either side of G is chosen, the neighbors lying along one of the compass directions N-S, E-W, NE-SW, or NW-SE, depending on which compass direction is closest in angle to $G_\theta$. The magnitude of the neighbor in the direction of positive gradient is called $G_+$, while the magnitude of the neighbor in the direction of negative gradient is called $G_-$.

The estimated gradient magnitude $G_0$ is compared with the estimated gradient magnitudes $G_+$ and $G_-$ of the chosen neighbors to determine whether $G_0$ is a local maximum of gradient magnitude, also called a peak. In a preferred embodiment, $G_0$ is a peak if $G_0 > G_+$ and $G_0 \geq G_-$. All gradient estimates that are peaks, and that pass the optional noise thresholding step, are deemed to be edges.

It should be noted that it can also be useful, although not preferable, to consider $G_0$ to be a peak if $G_0 > G_+$ and $G_0 > G_-$. Also, for example, the gradient estimates can lie on a non-square grid, such as a hexagonal grid, there can be non-grid-unit spacing of neighbors, and neighbors can be chosen based on directions other than the eight given compass directions.

For each edge detected by the above steps, the set of gradient magnitude estimates consisting of $G_0$ and the magnitude estimates of the above-chosen neighbors, e.g., $G_+$ and $G_-$, form a sampled one-dimensional profile of the edge. This one-dimensional profile is approximately along the gradient direction, although the discrete nature of the grid of gradient estimates makes it impossible in general to choose neighbors exactly along the gradient direction. Furthermore, again due to the discrete nature of the grid, in some embodiments, the chosen neighbors might not lie along a straight line.

The invention provides a method and apparatus for determining subpixel edge A position using a one-dimensional edge profile. In embodiments where the chosen gradient magnitude estimates along the profile are collinear, a curve-fitting method of interpolation is used to estimate the subpixel position of the gradient magnitude peak along the profile. Since there is no edge position information normal to the gradient direction, the interpolated edge position can be selected to be anywhere along a direction substantially normal to the gradient direction without significant loss of edge position information. In a preferred embodiment, for example, the interpolated edge position is selected so as to lie along a line in the gradient direction passing through $G_0$, so that the edge position is as close to $G_0$ as possible.

In embodiments where the chosen gradient magnitude estimates along the profile are not collinear, each estimate is first moved normal to the gradient direction so that the estimates lie along some chosen line. In a preferred embodiment, the chosen line passes through $G_0$ in the gradient direction. Once this adjustment is made, a curve-fitting method of interpolation is used to estimate the subpixel position of the gradient magnitude peak along the adjusted profile. In a preferred embodiment, the interpolated edge position is taken to be the estimated subpixel position of the gradient magnitude peak along the adjusted profile.

In a preferred embodiment using two neighbors whose gradient magnitude estimates are $G_+$ and $G_-$ as described above, a parabola is fit to the points $G_0$, $G_+$, and $G_-$ to provide an interpolated subpixel position of a gradient peak. The maximum of the parabola, i.e., the gradient peak, is taken to be the position of the gradient magnitude peak along the profile.

In another preferred embodiment, at least one two-dimensional interpolated position of the edge can be determined along a plane position line. A plane position line is a line that is normal to the gradient direction of a gradient point associated with a local maximum of gradient magnitude, also passing through the interpolated edge position along the profile.

In a further preferred embodiment, a two-dimensional interpolated position of the edge is determined as being at the intersection point of two lines. The first line is a gradient direction line that extends along the gradient direction of the gradient point from a gradient point associated with a local maximum of gradient magnitude. The second line is the plane position line that is normal to the gradient direction, also passing through the interpolated edge position.

The accuracy of any curve fitting method depends on the extent to which the behavior of gradient magnitude in the gradient direction matches the shape of the curve in a small region that includes the chosen neighbors. Given the discrete nature of the grid, the pattern of chosen neighbors necessarily depends on gradient direction. It is recognized by the invention that curves that work well for some patterns of neighbors do not work well for others. The invention solves this problem by choosing the curve separately for each edge in accordance with gradient direction.

In a preferred embodiment, the invention uses a single interpolation curve for all gradient directions, and then adjusts the interpolation result by means of a bias function having a parameter that is a function of gradient direction. This has the effect of simulating a large variety of interpolation curve shapes by adjusting a single parameter. In a further preferred embodiment, the bias function is a power law function and the parameter is the power. In another preferred embodiment, the power law bias function is applied to a parabolic interpolation curve. In still another preferred embodiment, the apparatus includes a lookup table to determine the adjustment of the interpolation result.

The invention provides a fast, computationally inexpensive method and apparatus for edge detection that is of higher accuracy than available in the prior art, as well as providing an accurate method and apparatus for edge detection that is faster and less computationally expensive than available in the prior art.

Moreover, the invention exploits computationally inexpensive estimates of gradient magnitude and direction to achieve accurate, computationally inexpensive, and fast estimates of edge position, providing accurate edge detection in a fast and computationally inexpensive manner, even for edges that are not substantially parallel to the axes of the pixel grid.

BRIEF DESCRIPTION OF THE DRAWINGS

The invention will be more fully understood from the following detailed description, in conjunction with the accompanying figures, wherein:

FIGS. 1a–1d show several sets of gradient estimation kernels that may be used to practice the invention. In particular.

FIGS. 2a–2c show several methods for computing gradient magnitude and direction. In particular.

FIGS. 3a–3c show several methods for choosing neighboring gradient estimates. In particular.

FIGS. 4a–4c show methods for interpolating edge position. In particular.

DETAILED DESCRIPTION OF THE DRAWINGS

FIG. 1 shows several sets of known convolution kernels that can be used to estimate components of gradient in a digital image. A digital image consists of a regular array of pixels. Each pixel is associated with a numerical value called a pixel value. Thus, an image can be defined as a regular array of numerical values. Each pixel value of a digital image. typically represents a physical attribute as measured by some device, for example, a pixel value can represent scene b rightness at a point as measured by a video camera. Alternatively, each pixel value of a digital image can be generated by computer program, without reference to any measured physical attribute, such as in a virtual reality system or computer graphics system. Further, in some applications, computer generated images and/or images provided by a video camera can be transformed mathematically to provide digitally processed images. In the following discussion, pixel values will be called brightness values, regardless of their origin.

A digital image typically consists of a square array of square pixels, but any regular planar tessellation may be used, such as a rectangular array of rectangular pixels, or hexagonal array of hexagonal pixels.

Gradient is estimated by first convolving an image with a set of kernels designed to estimate components of the gradient in selected directions. A kernel is a small array of numerical values arranged in the same grid pattern as the image pixels. To convolve an image with a kernel, the kernel is aligned with a set of image pixels at each position where gradient is to be estimated, the positions forming a regularly spaced grid on the image. The grid of positions where gradient is estimated may be identical to the grid of image pixels, in which case gradient is estimated at every position in the image, or it may be a shifted and/or regularly spaced subset of all possible image positions.

To perform a convolution of an image with a kernel, at each position in the image where gradient is to be estimated, each kernel value and the corresponding image pixel of the set of image pixels associated with the image position are multiplied. Then, the resulting products are summed to produce a single estimate of one component of gradient at the image position, which image position generally corresponds to the position of center of the kernel with respect to the image. Methods and apparatus for performing convolution of a digital image with a kernel have been in use for decades and are well-known in the art.

Since the component of image gradient in a given direction is the first derivative of image brightness, the kernels shown in FIG. 1 are all adapted to estimate the first derivative in a certain direction. Each set consists of at least two kernels, because at least two non-parallel components are needed to specify gradient.

Figure 1A:
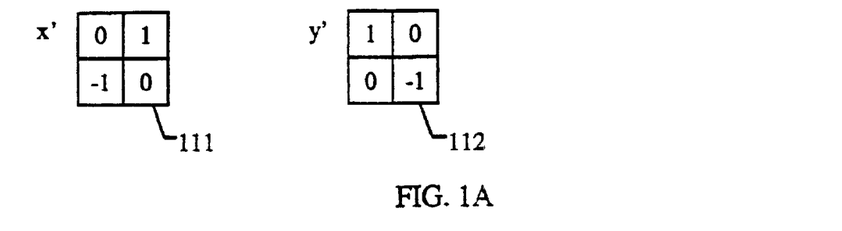
FIG. 1a shows the so-called Roberts Cross kernels.

In particular, FIG. 1a shows a set of Roberts cross kernels 111, 112. This set estimates gradient in directions oriented at 45° to the axes of the pixel grid. The set of Roberts cross kernels is perhaps the least expensive gradient estimator, but also is the most sensitive to image noise.

Figure 1B:
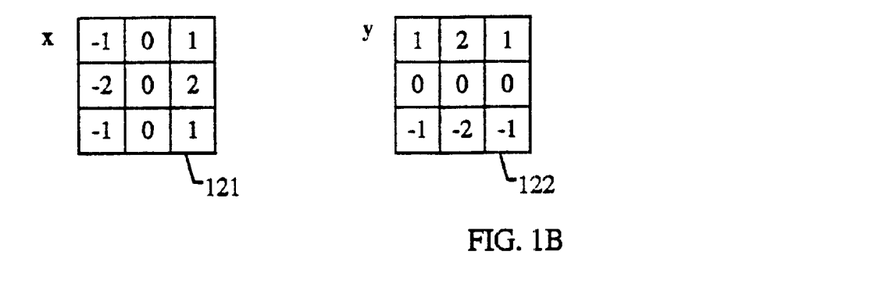
FIG. 1b shows the so-called Sobel kernels.

FIG. 1b shows a set of Sobel kernels 121, 122. These are also relatively inexpensive, but less sensitive to noise than the Roberts cross kernels due to summing normal to the component direction. The Sobel kernels estimate gradient in directions parallel to the axes of the pixel grid.

Figure 1C:
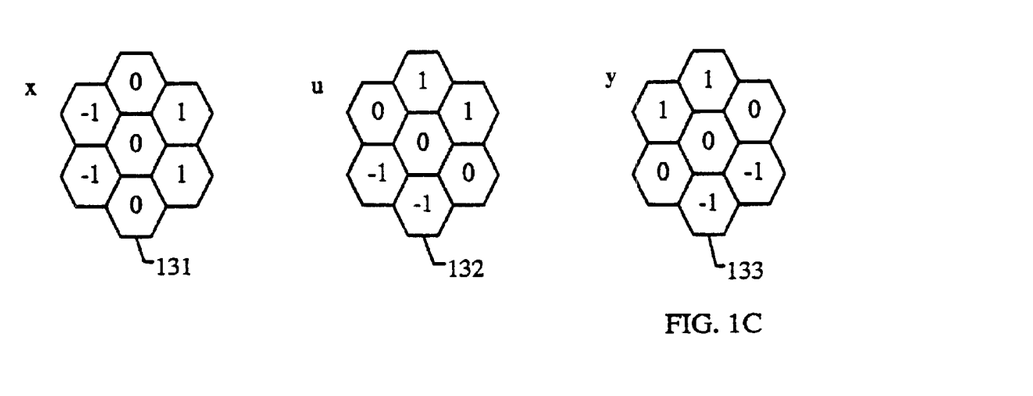
FIG. 1c shows an overdetermined set of kernels for use with a hexagonal pixel grid.

FIG. 1c shows a set of three kernels 131, 132, 133 that can be used on an image based on a hexagonal tessellation. Here, gradient is estimated in the three natural directions of the grid, the three directions being spaced 60° apart. Since gradient has only two degrees of freedom, this set is overdetermined—if the estimates were exact, any one of the components could be determined from the other two. Since the three components are only estimates, however, an overdetermined set can be used to improve the accuracy of the overall estimate of gradient.

Figure 1D:
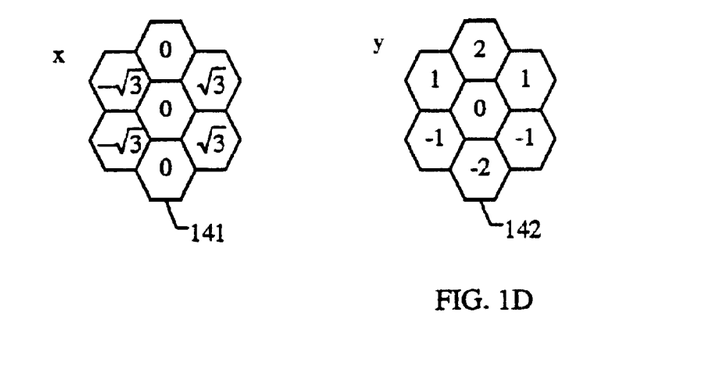
FIG. 1d shows a smaller set of kernels, equivalent to those of FIG. 1c in a least-squares sense.

One way to use an overdetermined set is to discard the weakest component(s) (least absolute value) at each point and use the two strongest for estimating gradient. A different method for estimating gradient is illustrated in FIG. 1d. Here, the three symmetric kernels 131, 132, 133 of FIG. 1c are used to form a pair of orthogonal kernels 141, 142 for use on a grid that has no natural orthogonal directions. The orthogonal pair 141, 142 is adapted to minimize the sum of the squared difference between the gradient components estimated by the kernels 131, 132, 133 of FIG. 1c and components in the same three directions, but derived from the orthogonal pair 141, 142 (the set shown in FIG. 1d includes an arbitrary scale factor to simplify the drawing).

The four kernel sets shown in FIG. 1 can be applied at every image position, and are appropriate for fine-scale, high resolution edge detection. To detect edges at coarser scales, the gradient estimation step can be modified in two ways—the image is first "smoothed" using an appropriate low pass filter, and then gradient is estimated only at a regularly spaced subset or sublattice of image positions, i.e., "sub-sampling" of gradient estimates is performed.

A variety of methods and apparatus are known that can perform the necessary smoothing and subsampling. Smoothing may be accomplished by convolving the image, prior to gradient estimation, with a kernel designed for that purpose, such as a Gaussian kernel. Alternatively, a smoothing function may be built into the gradient estimation kernels. Subsampling may be done by discarding image values after smoothing, or by discarding gradient estimates. Alternatively, subsampling may be built into the smoothing or gradient estimation steps by applying the appropriate kernels only in the desired positions.

It will be obvious to those skilled in the art that a wide variety of methods and apparatus can be used to estimate components of gradient for the purposes of practicing this invention. Images can be based on square, rectangular, hexagonal, or other regular planar tessellations. Kernels can be used that compute a simple difference of neighboring pixels, or can have some smoothing functionality incorporated with gradient estimation to provide noise suppression. Overdetermined sets of kernels can be used with any image tessellation scheme, with the weakest components at each point discarded. Orthogonal kernel pairs can be designed for tessellations that have no natural orthogonal directions. Smoothing and subsampling steps can be added for coarse-scale edges.

In a preferred embodiment, Sobel kernels 121 and 122, as shown in FIG. 1b, are used on a square tessellation. Image brightness values associated with each square pixel are eight-bit numbers, with gradient components estimated to a precision of eleven bits. If required, coarse-scale edge detection can start with a separate smoothing and subsampling step, based on a low-pass filter kernel, that approximates a two-dimensional Gaussian function.

Figure 2A:
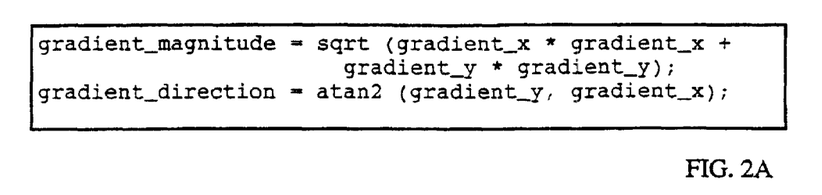
FIG. 2a shows part of a computer program that does the computation using a floating point unit.
Figure 2B:
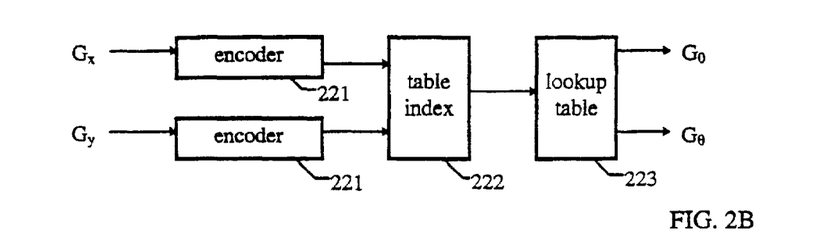
FIG. 2b shows a lookup-table-based method.
Figure 2C:
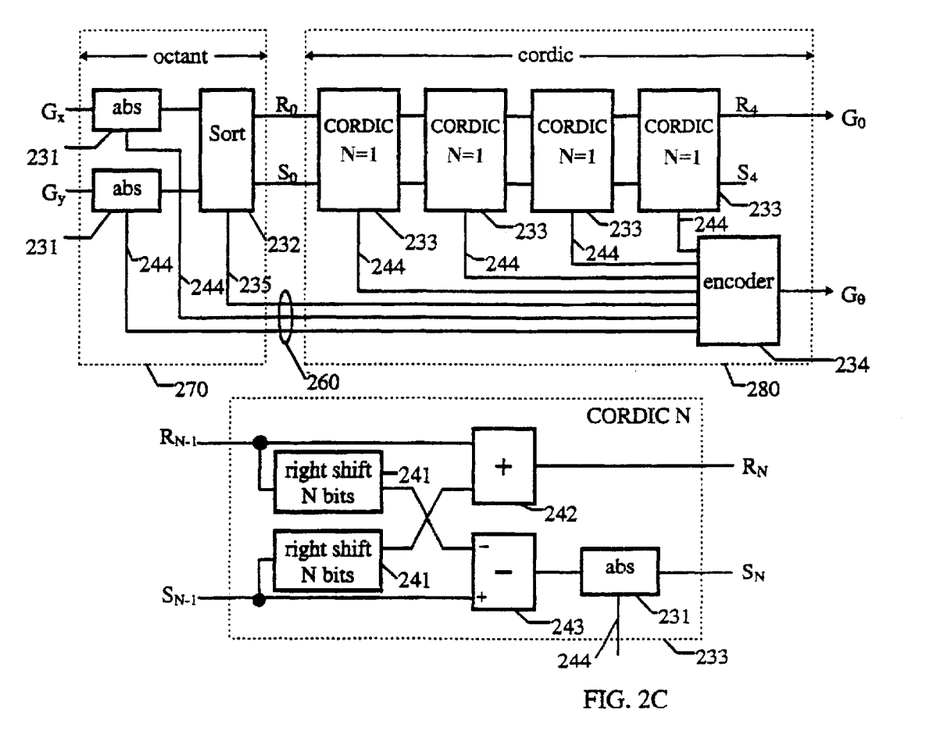
FIG. 2c shows a method based on the CORDIC algorithm.

FIG. 2 shows several approaches for converting a pair of gradient components into gradient magnitude and direction. Each of the approaches is designed to approximate the standard equations for rectangular-to-polar conversion:

$$G_0 = \sqrt{G_x^2 + G_y^2}$$

$$G_\theta = atn2(G_y, G_x) \quad \text{Equations 1A, 1B}$$

where $G_0$ is gradient magnitude, $G_\theta$ is gradient direction, $(G_x, G_y)$ are orthogonal gradient components, and atn2 is the four-quadrant arctangent function.

FIG. 2a shows a computer program written in a conventional language (e.g., the C computer language) for performing a gradient approximation. This program, when compiled, loaded into the memory of a conventional CPU along with supporting standard math library routines, and executed by the CPU, will cause gradient magnitude and gradient angle to be approximated from input gradient components using the CPU's floating point hardware. A similar operation can be performed using dedicated floating point hardware.

While the floating point method is satisfactory for use with this invention, less expensive and faster methods are preferable. Furthermore, the floating point method generally provides much greater precision than is meaningful given the nature of gradient estimation, and this unneeded precision may be considered wasteful.

FIG. 2b shows a method and apparatus based on a lookup table that is fast, inexpensive, and provides precision appropriate for gradient estimation. In this approach, a binary number representing each gradient component is passed to corresponding encoders 221 that serves to reduce the number of bits needed to represent each component, thereby reducing the size of the lookup table 223. The encoded components provided by the encoders 221 are combined by a table index generator 222 to form a table index, which is provided to a lookup table 223 and used therein as an address to fetch previously stored approximations of gradient magnitude and direction corresponding to the input gradient components. An apparatus according to this method can be built as dedicated hardware, or as part of a computer program that uses a portion of a conventional CPU's memory as the lookup table 223.

The encoders 221 can take a variety of forms as appropriate to the application. If sufficient memory is available, the encoders 221 may do nothing, passing the components unmodified to the table index generator 222. In another form, the encoders 221 may select some number of the high-order bits of each gradient component. In a preferred embodiment, the encoders 221 perform a logarithmic compression of the gradient component values. This logarithmic compression, or any other form of encoding, can be implemented using a small lookup table.

The table index generator 222 may simply combine the bits of the two encoded components. In another form, conventional two-dimensional array addressing is used.

In a preferred embodiment based on the table lookup method, the gradient components are signed eleven-bit numbers, the encoders are 2048-byte lookup tables that perform logarithmic compression to eight bits, the table index is a 16-bit address consisting of the two 8-bit codes, and the main lookup table is a 65,536-by-16-bit table that stores eight bits of gradient magnitude information and eight bits of gradient direction information for each combination of gradient component codes. Gradient direction is represented as a binary angle—the most significant bit corresponding to 180°, the next-most significant bit corresponding to 90°, the next-most significant bit corresponding to 45°, etc., down to the least significant bit, which corresponds to about 1.4°.

In many cases, the use of floating point hardware or large lookup tables is impractical or is too expensive. For example, it may be desirable to build the device on a portion of an application-specific integrated circuit (ASIC), in which case the number of transistors required for a floating point unit or a large lookup table would be prohibitive. As another example, it may be desirable to build the device using a CPU, such as an integer digital signal processor (DSP), whose floating point unit is not fast enough for a given application, such as edge detection, or where random access to main memory is too slow for a given application. In these cases the preferred embodiment is shown in FIG. 2c, which shows a method and apparatus for converting gradient components to magnitude and angle using the CORDIC algorithm.

The CORDIC method/apparatus shown in FIG. 2c is fast, inexpensive, and provides precision appropriate to the problem of gradient estimation—just under seven bits of magnitude and angle information, which is sufficient but not wasteful. It can be implemented using a CPU executing appropriate software, or can be implemented as dedicated hardware. In the case of dedicated hardware, the method is well-suited to pipelined processing, resulting in very high speed operation.

In FIG. 2c, the gradient components ($G_x$, $G_y$) are passed to an octant unit 270. This unit 270 outputs a 3-bit code 260 that indicates within which octant the gradient direction falls, and the values $R_0$ and $S_0$, where $R_0$ and $S_0$ are defined by:

$$R_0 = \max(|G_x|, |G_y|)$$

$$S_0 = \min(|G_x|, |G_y|) \quad \text{Equations 2A, 2B}$$

The octant unit 270 includes two absolute value elements 231, which output both the absolute value of their input and a sign bit 244 indicating the sign of the input: 0 for input $\geq 0$ and 1 for input $<0$, for example. Thus, the sign bit indicates whether or not the abs element 231 has inverted the sign of its input. The sign bit 244 of $G_y$ is the 180° bit, and the sign bit 244 of $G_x$ is the 90° bit, of the octant code 260.

The octant unit 270 includes a sort element 232, which sorts its inputs so that the higher one comes out as $R_0$ and the lower one as $S_0$. The sort element 232 also outputs a bit 235 indicating which input was highest: 0 for $|G_x| \geq |G_y|$, and 1 otherwise. This bit 235 is the 45° bit of the octant code 260, as shown in Table 1, below.

Table 1 shows the relationship between the octant codes 260 and the high three bits of binary angle. Also shown is the 8-bit binary angle Q corresponding to the nearest quadrant, which will be used below in the description of the encoder element 234. The 45° bit 235 of the binary angle is marked as B for the description below of the encoder element.

TABLE 1

| octant code | | | binary angle | | | nearest |
| --- | --- | --- | --- | --- | --- | --- |
| 180° | 90° | 45° | 180° | 90° | 45° B | quadrant Q |
| 0 | 0 | 0 | 0 | 0 | 0 | 00000000 |
| 0 | 0 | 1 | 0 | 0 | 1 | 01000000 |
| 0 | 1 | 0 | 0 | 1 | 1 | 10000000 |
| 0 | 1 | 1 | 0 | 1 | 0 | 01000000 |
| 1 | 0 | 0 | 1 | 0 | 0 | 10000000 |
| 1 | 0 | 1 | 1 | 0 | 1 | 11000000 |
| 1 | 1 | 0 | 1 | 1 | 1 | 00000000 |
| 1 | 1 | 1 | 1 | 1 | 0 | 11000000 |

Referring to FIG. 2c, the octant code 260 and the values $R_0$ and $S_0$ are passed to a CORDIC unit 280. The CORDIC unit 280 can include one or more CORDIC blocks 233; in the embodiment of FIG. 2c, four CORDIC blocks are used. Each CORDIC block effectively rotates its input vector ($R_{N-1}$, $S_{N-1}$) towards the x-axis by an amount $\tan(2^{-N})$ to iFE provide a rotated input vector, and then transforms the rotated input vector so as to ensure that it falls within the first octant by taking the absolute value of the y-component of the rotated input vector. With each successive CORDIC block 233, the R values are driven further towards the gradient magnitude (the length of the vector) and the S values are driven further towards 0.

The rotation of each input vector is accomplished by means of right-shifting elements 241, an adder 242, and a subtractor 243. The absolute value function mentioned above is accomplished by the absolute value element 231.

The R output of the final CORDIC block 233 is a good approximation to gradient magnitude $G_0$, although multiplied by an arbitrary scale factor that depends on the number of CORDIC blocks used. The scale factor is about 1.16 for $N \geq 3$.

Each CORDIC block 233 also outputs a sign bit 244 indicating whether the y-component of the rotated vector was negative prior to the absolute value function of element 231. The sign bit 244 comes from the absolute value element 231, which is identical to the like-numbered abs elements of the octant unit 270 previously described. These sign bits (also referred to herein as "direction bits") 244 are used to refine the Fin approximation to gradient direction initially produced by the octant unit 270. Each successive CORDIC block 233 gives about one additional bit of gradient direction precision.

The relationship between the direction bits 244 produced by the CORDIC blocks and gradient direction is shown in Table 2 as follows:

TABLE 2

| CORDIC direction bits 1–4 | gradient direction range, degrees | 8-bit binary angle C |
| --- | --- | --- |
| 0111 | 0.00–1.82 | 00000001 |
| 0110 | 1.82–5.40 | 00000011 |
| 0100 | 5.40–8.98 | 00000101 |
| 0101 | 8.98–12.53 | 00001000 |
| 0001 | 12.53–16.08 | 00001010 |
| 0000 | 16.08–19.66 | 00001101 |
| 0010 | 19.66–23.25 | 00001111 |
| 0011 | 23.25–26.57 | 00010010 |
| 1011 | 26.57–29.90 | 00010100 |
| 1010 | 29.90–33.48 | 00010111 |
| 1000 | 33.48–37.06 | 00011001 |
| 1001 | 37.06–40.61 | 00011100 |
| 1101 | 40.61–44.16 | 00011110 |
| 1100 | 44.16–45.00 | 00011111 |
| 1110 | >45 | 00011111 |
| 1111 | >45 | 00011111 |

The CORDIC unit 280 computes gradient direction $G_\theta$ from the octant code 260 and the CORDIC direction bits 244 by means of encoder element 234. The encoder 234 can be implemented as a computer program, or as dedicated hardware, using lookup tables, logic elements, and arithmetic elements as appropriate to the application. The encoder 234 determines, via table lookup or boolean logic, for example, and using the octant code 260, the 8-bit binary angle Q of the nearest quadrant, and the value B of the 45° binary angle bit, both as shown in Table 1. The 180 and 90 degree binary angle bits are included for completeness. The encoder 234 also determines via table lookup, for example, the 8-bit binary angle C from the CORDIC direction bits as shown in Table 2. The resulting angle computed by the encoder is Q+C if B is 0, Q−C if B is 1.

It will be evident to those skilled in the art that many variations on the CORDIC method/apparatus shown in FIG. 2c can be used to approximate gradient magnitude and direction from the gradient component estimates for the purpose of practicing this invention. It should also be evident that methods/apparatus for approximating gradient magnitude and direction from the gradient component estimates are not limited to the three approaches described in FIG. 2, but that any method/apparatus that performs the approximation to sufficient precision is satisfactory.

Regarding terminology used herein, the term "approximation" refers to a purely computational process that can be carried out to any desired precision. The term "estimation" refers to a partly physical process, the accuracy of which is limited by ones ability to make measurements. These physical limitations arise from many factors, including electro-optical resolution, signal noise, pixel grid effects, etc. Thus, the computation of gradient magnitude and direction from the non-parallel gradient components is an approximation (of the appropriate mathematical formula), but the resulting gradient magnitude and direction values themselves are estimates, since they are based on components that are estimates.

The methods/apparatus of FIG. 2 as described above assume that an orthonormal pair of kernels was used to estimate the gradient components. These methods/apparatus can easily be modified for non-orthonormal pairs as might arise, for example, when using an overdetermined set of gradient components, and discarding all but the strongest two gradient components. The simplest solution is to multiply each gradient component by a 2×2 matrix to transform the components to an orthonormal basis before applying the methods of FIG. 2. With the lookup table method of FIG. 2$b$, the effect of the matrix multiplication can be built into the lookup table in the typical case where the chosen components are in a fixed relative orientation, eliminating the need for the matrix multiply operation. The CORDIC method/apparatus of FIG. 2$c$ can also be modified to handle the non-orthonormal case without the need for the matrix multiply, generally by modifying the encoder element 234 so as to incorporate the effect of a matrix multiply operation.

If a sufficiently large overdetermined set of kernels is used, approximate gradient magnitude and direction can be obtained from the gradient components provided thereby without the need for an apparatus to approximate the rectangular-to-polar conversion equations, such as those shown in FIG. 2. In such an embodiment, the absolute value of the strongest gradient component, i.e., the gradient component having the largest absolute value, is a good approximation to the gradient magnitude $G_0$, and the direction of the strongest gradient component (a known property of the kernel used to obtain the strongest gradient component) is a good approximation to the gradient direction $G_\theta$. In a further refined embodiment, the strongest component and its two closest neighbors in direction are used to interpolate gradient magnitude and direction by fitting a curve, such as a parabola, to the component values.

Figure 3A:
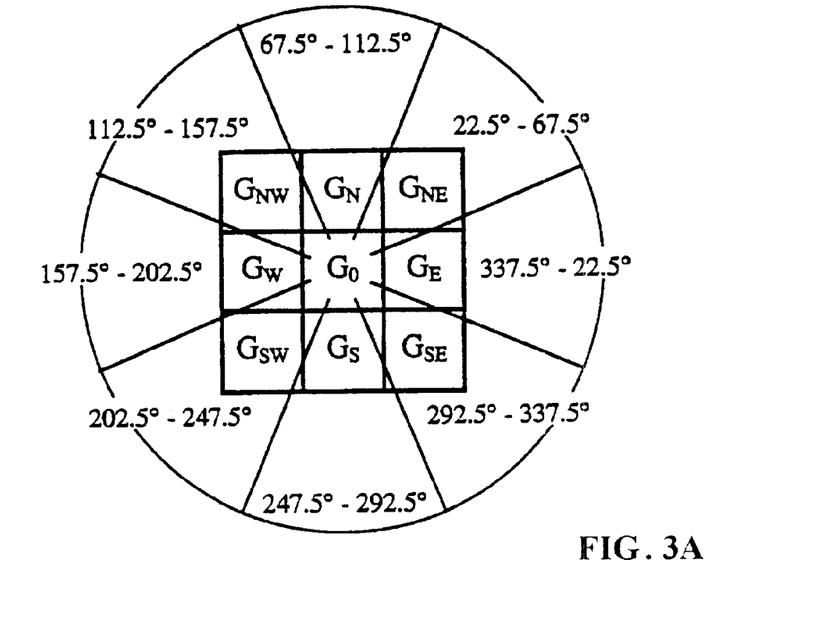
FIG. 3a shows a simple method to be used on a 3×3 square grid, FIG. 3b a method that can be used on a hexagonal grid, and FIG. 3c a method for a 5×5 square grid.
Figure 3B:
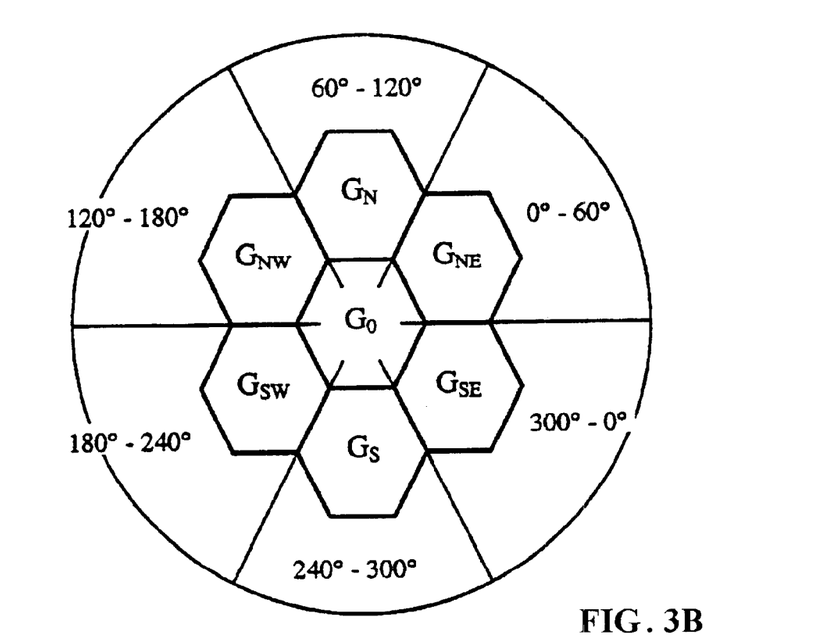
Figure 3C:
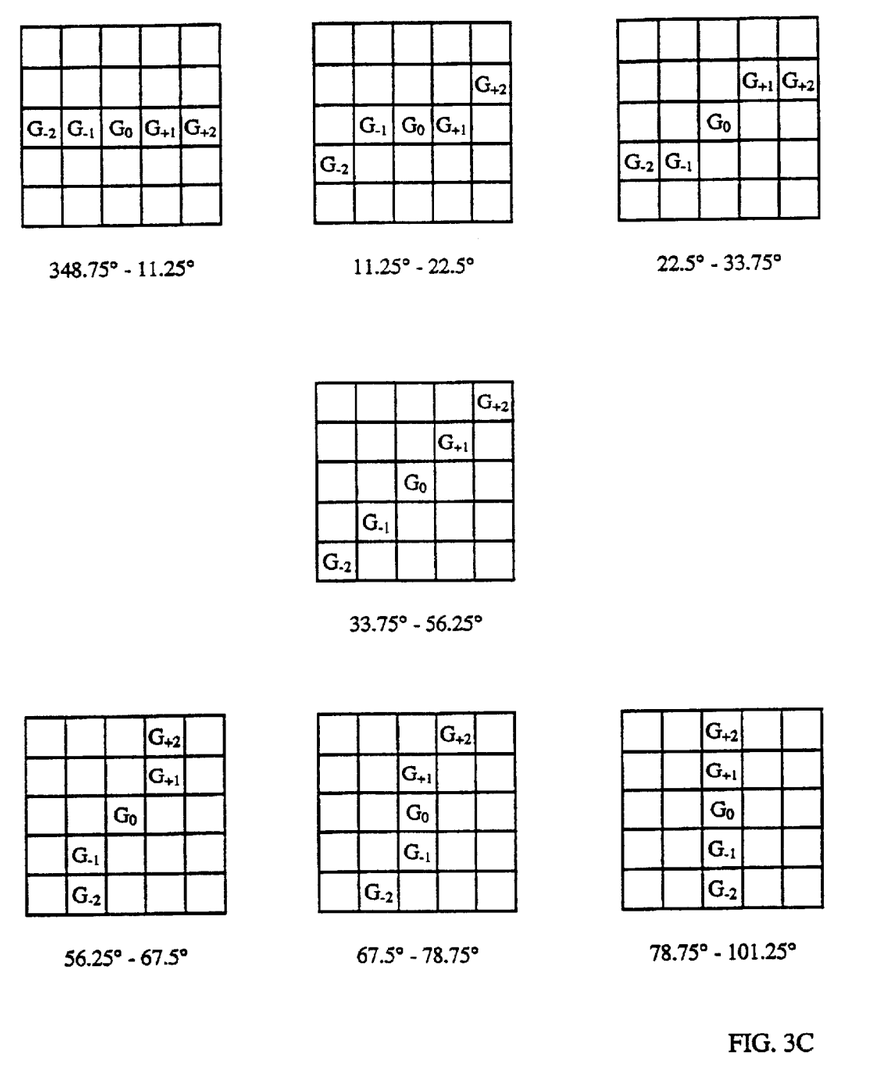

The invention uses a regular array of gradient estimates to determine accurate subpixel positions of edges to be detected. Each gradient estimate consists of a gradient magnitude estimate and a gradient direction estimate. According to the invention, it is useful to perform a gradient estimate at a plurality of regularly-spaced locations of a regular grid, herein referred to as a gradient grid. The gradient grid can be displaced by a fraction of a pixel with respect to the underlying pixel grid, and such displacement can be in any direction. Also, the gradient grid can be a subset of the pixel grid, e.g., one gradient point for each group of four pixel points. It is convenient to refer to each gradient estimate, taken together with the grid location of the gradient estimate, as a gradient estimate grid element. It is also convenient to refer to a plurality of regularly spaced gradient estimate grid elements as a gradient estimate grid. In FIG. 3, for illustrative purposes, gradient estimate grid elements are depicted as tiles, where some of the tiles are labeled by the gradient magnitude estimate of the underlying gradient estimate grid element.

To obtain a sampled profile of gradient magnitude in approximately the gradient direction at each of a plurality of locations of the gradient grid, a set of neighboring gradient estimate grid elements is selected for each of the plurality of gradient grid locations. Each gradient estimate grid element of each set of neighboring gradient estimate grid elements can be labeled by a symbol representing a gradient magnitude at a particular position along the sampled profile. For example, the center gradient estimate grid element of a set of neighboring gradient estimate grid elements can be labeled by $G_0$, as shown in FIG. 3.

FIG. 3 shows several methods for selecting, as a function of gradient direction, a set of neighboring gradient estimate grid elements that are neighbors of a center gradient estimate grid element. For each method, the goal is to obtain a sampled profile of gradient magnitude in approximately the gradient direction. Given the discrete nature of the gradient estimate grid, and the fact that the chosen neighboring gradient estimates are generally only one or two gradient estimate grid elements away from the center gradient estimate grid element labeled by $G_0$, the sampled profile will not exactly match the gradient direction. Furthermore, the gradient estimate grid elements along the profile may not be collinear.

A preferred embodiment is shown in FIG. 3$a$. Here, two neighbors are chosen, labeled by $G_+$ and $G_-$, from among the eight neighbors of $G_0$ shown in the figure. FIG. 3$a$ shows the range of gradient directions for which each neighbor will be chosen as $G_+$. In each case the 180° opposite neighbor will be chosen as $G_-$. For example, for gradient directions in the range 112.5°–157.5°, $G_+$ will be $G_{NW}$ and $G_{-1}$ will be $G_{SE}$. The gradient direction ranges are chosen to fall on 22.5° boundaries, so at least 4 bits of precision in gradient direction, represented as a binary angle, are needed.

In a preferred embodiment of an apparatus based on the method of FIG. 3$a$, the gradient magnitude estimates are stored in a random access memory as a regular 2-dimensional array. The address offset of a neighbor of any gradient magnitude estimate in a given compass direction is a constant, and the address offset of the 180° opposite neighbor is the negative of this constant. These address offset constants are stored in a small lookup table indexed by the high order four bits of gradient direction. For each ($G_0$, $G_\theta$) pair, $G_\theta$ is used to lookup the address offset from $G_0$ of the neighbors. This offset is added to and subtracted from the address of $G_0$ to form addresses used to fetch the $G_+$ and $G_-$ neighbors, respectively.

The above apparatus may be implemented by means of appropriate software, using the computer's memory both to store the gradient estimates and for the address offset lookup table. Alternatively, it may be implemented in dedicated hardware. In either case, it is not necessary that the entire array of gradient magnitude estimates be stored in memory simultaneously. In a preferred embodiment where the computation of gradient magnitude and direction is done in raster order, only the last three rows of gradient magnitude estimates need be in memory at any one time for an apparatus based on lookup of address offset to work.

FIG. 3$b$ shows a method for choosing neighbors for when the invention is practiced on a hexagonal grid. An apparatus based on this method is similar to the one described for FIG. 3$a$ above.

FIG. 3$c$ shows a method wherein four neighbor gradient estimate grid elements are chosen on a 5×5 grid. Note that only seven of the twelve possible patterns are shown; the others are just symmetries of the given ones. An apparatus based on this method is similar to the one described for FIG. 3$a$ above, although in this case at least five bits of gradient direction are needed.

The invention includes a method and apparatus for determining whether a gradient estimate G corresponds to an edge (a local maximum of gradient magnitude in the gradient direction), within the limits of detection imposed by the discrete grid of gradient estimates. The methods/apparatus are based on a comparison of the gradient estimate $G_0$ with the gradient estimates of its neighbors that were chosen based on the direction $G_\theta$.

In a preferred embodiment where two neighbor grid elements labeled by $G_+$ and $G_-$ are chosen, G is a peak if $G_0 > G_+$ and $G_0 \geq G_-$. The choice of which gradient magnitude ($G_+$ or $G_-$) is compared with $G_0$ using ">" and which is compared using "≧" is arbitrary, but the asymmetric comparison serves to ensure that exactly one grid element will be selected as being associated with. a peak if two or more neighboring gradient estimates along the profile have equal magnitude. If ">" were used for both comparisons, and two or more neighbor grid elements were associated with gradient estimates of equal magnitude, no peak would be selected. If "≧" were used for both comparisons, all equal neighbor grid elements would be selected as being associated with a peak. Although it is possible to practice the invention using any of these methods of comparison, selecting exactly one peak in the case of neighbor grid elements associated with equal gradient magnitude estimates is preferred.

In the case of two neighboring grid elements having equal gradient magnitude estimates, it does not matter which grid element is selected as the peak, since the interpolation methods to be described below will place the actual edge position halfway between the grid elements. If more than two neighbors have equal magnitude, the edge position is somewhat indeterminate, and the method described herein will select the first or last such neighbor. Although some might consider it preferable to select one closer to the center, this case occurs so infrequently in practice that the preferred embodiments do not do so—the benefits are considered not worth the computational cost.

With embodiments that choose more than two neighbors, many more methods of comparison are possible. Variations on the above-described two-neighbor methods can be practiced by combining the neighbors on either side of $G_0$ to produce $G_+$ and $G_-$ values. Some embodiments of this form simply choose one of the neighbors on each side, such as the closest, farthest, or middle. Others combine the neighbors to form the mean or median.

In another variation, the neighbors on either side of $G_0$ are combined by choosing the largest value, which has the effect of requiring $G_0$ to be greater than all of its neighbors on one side, and greater than or equal to all of its neighbors on the other side. Thus, excessively local peaks are rejected. One skilled in the art can doubtless generate many variations as appropriate for the purposes of practicing this invention.

In embodiments where a noise threshold is used, gradient peaks whose magnitude falls below the noise threshold are not considered edges.

The result of the steps of the methods described up to this point, and the output of the elements of the corresponding apparatus, is a list of edges—all points on the gradient estimate grid that are associated with local maxima in the gradient direction and are not below the noise threshold. For each such edge in the list, the following information is recorded: the gradient magnitude $G_0$ and direction $G_\theta$, the integer grid position of the edge, and the magnitude values of the chosen neighbors of $G_0$.

Figure 4A:
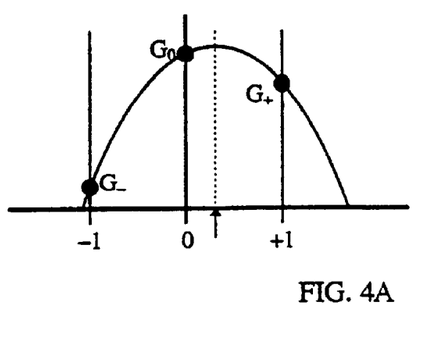
FIG. 4a shows a parabolic interpolation method for interpolating along a gradient magnitude profile.
Figure 4B:
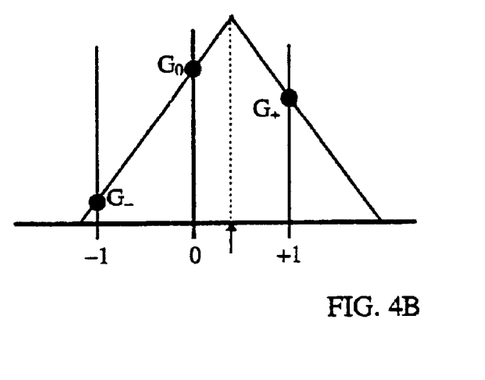
FIG. 4b shows a linear interpolation method for interpolating along a gradient magnitude profile.
Figure 4C:
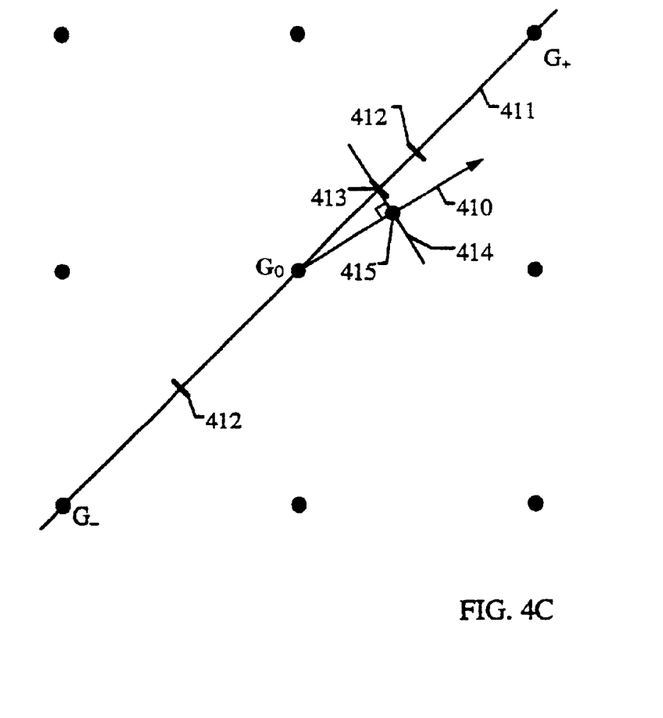
FIG. 4c shows a method for determining edge position in the plane based on interpolation along a gradient magnitude profile.

FIGS. 4a and 4b each show a method for obtaining a subpixel interpolated edge position along a sampled gradient magnitude profile, where the sampled gradient magnitude profile includes a peak magnitude estimate $G_0$ and its chosen neighbors $G_+$ and $G_-$, and where the points labeled by $G_0$, $G_+$, and $G_-$ represent the locations of respective gradient estimate grid elements (not shown). FIG. 4c shows a method for determining two-dimensional edge position in the plane of gradient estimate grid elements, based on the subpixel interpolated edge position as obtained in FIG. 4a or 4b, for example. The plane of gradient estimate grid elements is co-planar with respect to the plane of pixel grid elements.

FIG. 4a shows a preferred embodiment based on two equally spaced, collinear neighbors. Points corresponding to $G_0$, $G_+$, and $G_-$ are plotted on a graph where the horizontal axis is distance along the sampled gradient magnitude profile and the vertical axis is gradient magnitude. The horizontal distance scale is chosen arbitrarily so that $G_+$ and $G_-$ are one unit away from $G_0$. A parabola passing through the three points is constructed, and the position of its maximum is taken to be the edge position along the sampled gradient magnitude profile.

The use of the asymmetrical comparison $G_0 > G_+$, $G_0 \geq G_-$ insures that the parabola is not degenerate, so its maximum exists. Furthermore, the position of the maximum always falls within ±0.5 units of $G_0$, which is sensible—if the peak were closer to one of the neighbors than to $G_0$, one would expect that this neighbor would have been the selected peak instead of $G_0$.

A formula for obtaining the interpolated peak position is $$s = \frac{G_+ - G_-}{4G_0 - 2(G_+ + G_-)} \qquad \text{Equation 3}$$

where s is distance from $G_0$ in the $G_+$ direction in the arbitrary units. The value s is then multiplied by the actual distance between $G_0$ and the neighbors to obtain the interpolated edge position along the profile in pixels, for example.

FIG. 4b shows an alternative method based on linear interpolation. This method assumes that gradient magnitude falls off linearly and equally on either side of an edge. A first line is constructed passing through $G_0$ and the neighbor having the smaller At magnitude. A second line is constructed passing through the other neighbor and of slope that is the negative of the slope of the first line. The intersection of the first and second lines gives the interpolated edge position along the profile.

As with the parabolic method shown in FIG. 4a, a solution always exists if the n asymmetrical comparison is used, and the solution falls within ±0.5 units of $G_0$. The formula for linear interpolation is $$s = \frac{G_+ - G_-}{2[G_0 - \min(G_+, G_-)]} \qquad \text{Equation 4}$$

where again, s is distance from $G_0$ in the $G_+$ direction in the arbitrary units. The value s is then multiplied by the actual distance between $G_0$ and the neighbors to obtain the interpolated edge position along the profile, in pixels, for example.

In a preferred embodiment, an apparatus according to either the parabolic or linear methods of FIG. 4a or 4b uses a conventional CPU with appropriate software to approximate the above formulas.

The invention includes a method and apparatus for determining edge position in the plane of gradient estimates from its position along a sampled gradient magnitude profile. A preferred embodiment, based on the method for choosing neighbors shown in FIG. 3a, is shown in FIG. 4c.

In the example shown in FIG. 4c, the gradient direction 410 is about 30°, so the $G_+$ neighbor is chosen to be $G_{NE}$, and the $G_-$ neighbor is $G_{SW}$. The sampled gradient magnitude profile, consisting of $G_0$, $G_+$, and $G_-$, falls along the line 411. The interpolated edge position 413 along the sampled gradient profile, as determined by the methods of FIG. 4a or 4b, or any other appropriate method, falls along the line 411 between the ±0.5 unit limits 412. Note that in this case the arbitrary units of the above interpolation formulas are $\sqrt{2}$ times the grid spacing. If the gradient direction were such that non-diagonal neighbors were chosen, the arbitrary units would be equal to the grid spacing.

Since edge position is defined as a point along a line in a given direction, there is a remaining degree of freedom inherent in the specification of edge position; the position of the edge along the direction normal to the given direction. More specifically, an edge can be localized along the gradient direction, but no information regarding edge position along a direction that is normal to the gradient direction is available. Thus, the edge may usefully be considered to lie in the vicinity of the interpolated position 413, e.g., somewhere along a plane position line 414 that passes through the interpolated position 413 and that is normal to the gradient direction 410. In a preferred embodiment, the edge position is defined to be the point 415 at the intersection of the plane position line 414 that passes through the interpolated position 413 and that is normal to the gradient direction 410, with the line 410 that passes through $G_0$ along the gradient direction 410. The point 415 is the point along plane position line 414 that is closest to the point labeled by $G_0$.

In a preferred embodiment of an apparatus according to the method of FIG. 4c, a conventional CPU is used with appropriate software. This software reads the interpolated position 413, in the above-described arbitrary units, along the profile 411. This position is multiplied by the grid spacing, and, if the gradient direction is such that diagonal neighbors were chosen, by a further factor of $\sqrt{2}$. The result of this computation is multiplied by the cosine of the angle between the gradient direction 410 and the profile line 411 to provide as an output the distance of the edge point 415 from $G_0$ in the gradient direction.

In embodiments of the invention where more than two neighbors are chosen, various alternatives to the 3-point interpolation methods of FIG. 4 can be used. Methods similar to the parabolic and linear methods can be used by means of conventional least-squares fitting techniques.

In embodiments of the invention where the gradient magnitude samples along the profile are not collinear, for example as would occur for certain gradient directions in embodiments according to FIG. 3c, the samples, prior to the interpolation step, are moved normal to the gradient direction until they lie along the line passing through $G_0$ in the gradient direction. This is similar to moving the interpolated position 413 in FIG. 4c normal to the gradient direction 410 until it lies in the gradient direction from $G_0$, except that it happens before the interpolation step rather than after it.

In embodiments of the invention where the gradient magnitude samples along the profile are not equally spaced, the relative spacing can be accounted for in the curve-fitting formulas. Many such curve-fitting formulas have long been well-known in the art.

Figure 5:
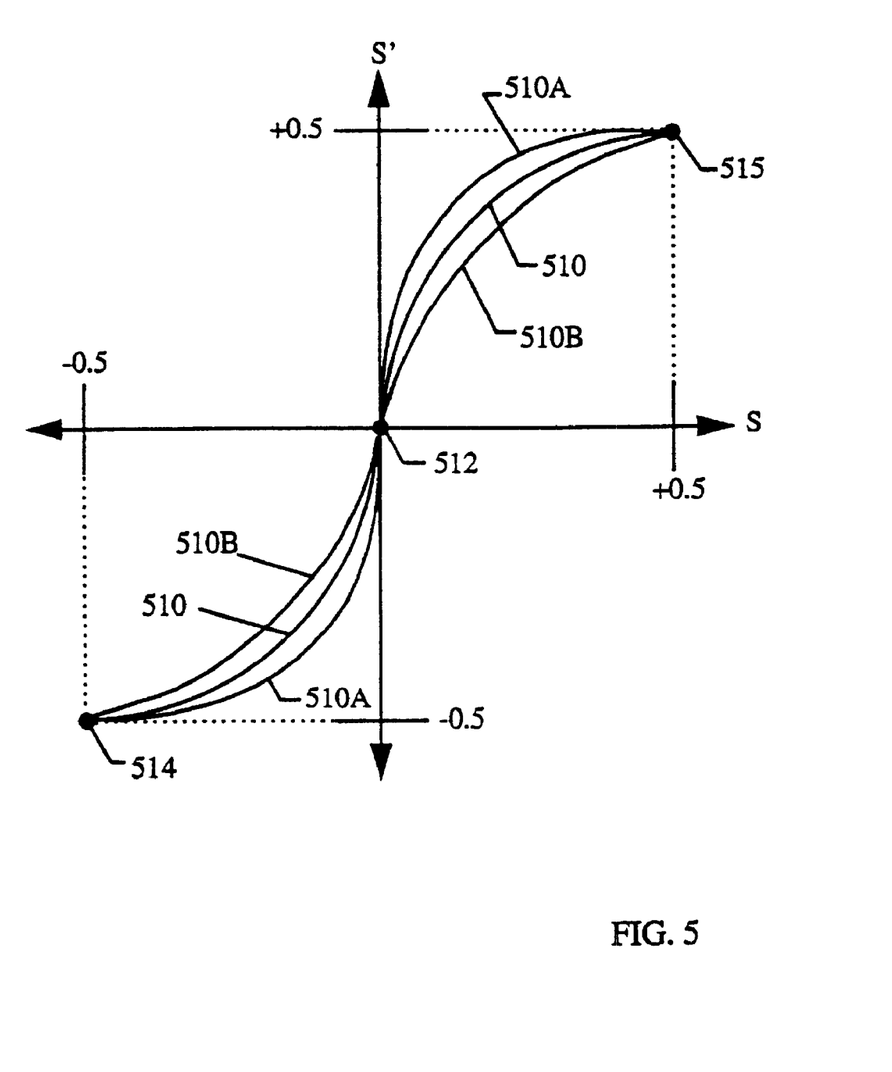
FIG. 5 is a graph of three power law curves that can be used for adjusting the shape of the curve that is fit to the points along the gradient magnitude profile, selected based on gradient direction.

With reference to FIG. 5, the accuracy of any curve fitting method of interpolation depends on the extent to which the actual behavior of gradient magnitude in the gradient direction matches the shape of the model curve in a small region that includes the chosen neighbors. One might expect the actual behavior of gradient magnitude to depend on the image brightness profile in the vicinity of the edge, the specific convolution kernels used to estimate the gradient components, the pattern of neighbors chosen for the interpolation, and the alignment of gradient direction with respect to the axes of the pixel grid. Experience shows that the kernels and the pattern of neighbors are significant effects, while alignment of gradient direction with respect to the pixel grid, other than the major consequence of choosing the pattern of neighbors, is relatively minor in effect.

The effect of the image brightness profile is more difficult to characterize. If one is allowed to manipulate such a profile arbitrarily, one might expect to be able to generate a wide range of gradient magnitude profiles. Nevertheless, experience with both synthetic and measured images shows that, for a given convolution kernel and pattern of neighbors, the shape of the gradient magnitude profile is surprisingly constant over a wide range of edge "sharpness". As recognized by the invention, since the kernels are constant over the image, and the pattern of neighbors depends only on gradient direction, this experience suggests that one should choose the shape of the curve to be used for the interpolation based on gradient direction at each detected edge.

The invention provides a method and apparatus for choosing the interpolation curve independently for each edge as a function of gradient direction of the edge. The invention can be used to compensate for varying shapes of the gradient magnitude profile due to the effects of the pattern of chosen neighbors, or due to the alignment of gradient direction with respect to the pixel grid, or both. The method and apparatus of the invention can also be used for choosing the interpolation curve based on any characteristic of the image that can be qualified or quantified.

In a preferred embodiment based on the Sobel kernels of FIG. 1b, and the neighbor selection method of FIG. 3a, the parabolic interpolation curve of FIG. 4a is used for gradient directions that result in N-S or E-W neighbors, and the linear interpolation curve of FIG. 4b is used for gradient directions that result in NE-SW or SE-NW neighbors.

FIG. 5 shows a preferred embodiment of a method that is simple, inexpensive, and flexible. In this embodiment, a single interpolation curve is used for all gradient directions, which produces a result s in the range ±0.5 in arbitrary units. An adjusted interpolation value s', also in the range ±0.5, is obtained from s by means of the "S" shaped function 510, as shown in FIG. 5. A bias parameter that is a function of gradient direction is used to adjust the shape of the "S" function, which has the effect of simulating a large variety of interpolation curve shapes, e.g., 510A and 510B, by adjusting a single parameter.

In one embodiment of this method, the "S" function is a power law, and the bias parameter b is the power:

$$s' = s|2s|^b, \quad b > -1 \qquad \text{Equation 5}$$

This method has several important properties. First, s'=s at the center point 512, and at the endpoints 514 and 515, regardless of the bias value b. This property reflects our intuition about the interpolation—that regardless of the shape of the gradient magnitude profile, the following relations shown in Table 3 should hold:

TABLE 3

| condition | location of edge | interpolation value s | point in FIG. 5 |
|---|---|---|---|
| $G_+ = G_-$ | at $G_0$ | 0.0 | center point 512 |
| $G_0 = G_+$ | halfway between $G_0$ and $G_+$ | +0.5 | end point 515 |
| $G_0 = G_-$ | halfway between $G_0$ and $G_-$ | −0.5 | end point 514 |

The effect of the bias parameter can be summarized in Table 4 as follows:

TABLE 4

| bias | s', s relationship | effect on interpolated edge |
|---|---|---|
| b = 0 | s' = s | none |
| b > 0 | ls'l ≦ lsl | pulled towards $G_0$ |
| −1 < b < 0 | ls'l ≧ lsl | pushed away from $G_0$ |

A preferred embodiment of an apparatus according to the method of FIG. 5 uses a conventional CPU and appropriate software to choose a bias value as a function of gradient direction, and to apply the resulting function 510 to an interpolated value s. The resulting value s' replaces s as input to the next element, typically multiplied by the neighbor spacing factor, as described above in conjunction with FIG. 4c.

In one version of this embodiment, a predetermined bias value is used for each possible pattern of neighbors, each such pattern of neighbors corresponding to a certain range of gradient directions. The s' values of the "S" function corresponding to each such bias value is stored in a lookup table of appropriate resolution in s. As is well-understood by those skilled in the art, appropriate software can be used to choose the lookup table based on gradient direction, and then use the interpolated value s to lookup the adjusted value s'.

The bias values used for selected preferred embodiments based on the neighbor selection method of FIG. 3a are given in Table 5, below:

TABLE 5

| convolution kernels | interpolation curve | bias for N–S, E–W neighbors | bias for NE–SW, SE–NW neighbors |
|---|---|---|---|
| Sobel | parabolic | 0.0 | −0.5 |
| Sobel | linear | +0.5 | −0.2 |
| Roberts | parabolic | −0.7 | −0.7 |
| Roberts | linear | −0.6 | −0.6 |

It will be obvious to one skilled in the art that many variations on the method and apparatus of FIG. 5 can be arranged to suit various applications.

Figure 6:
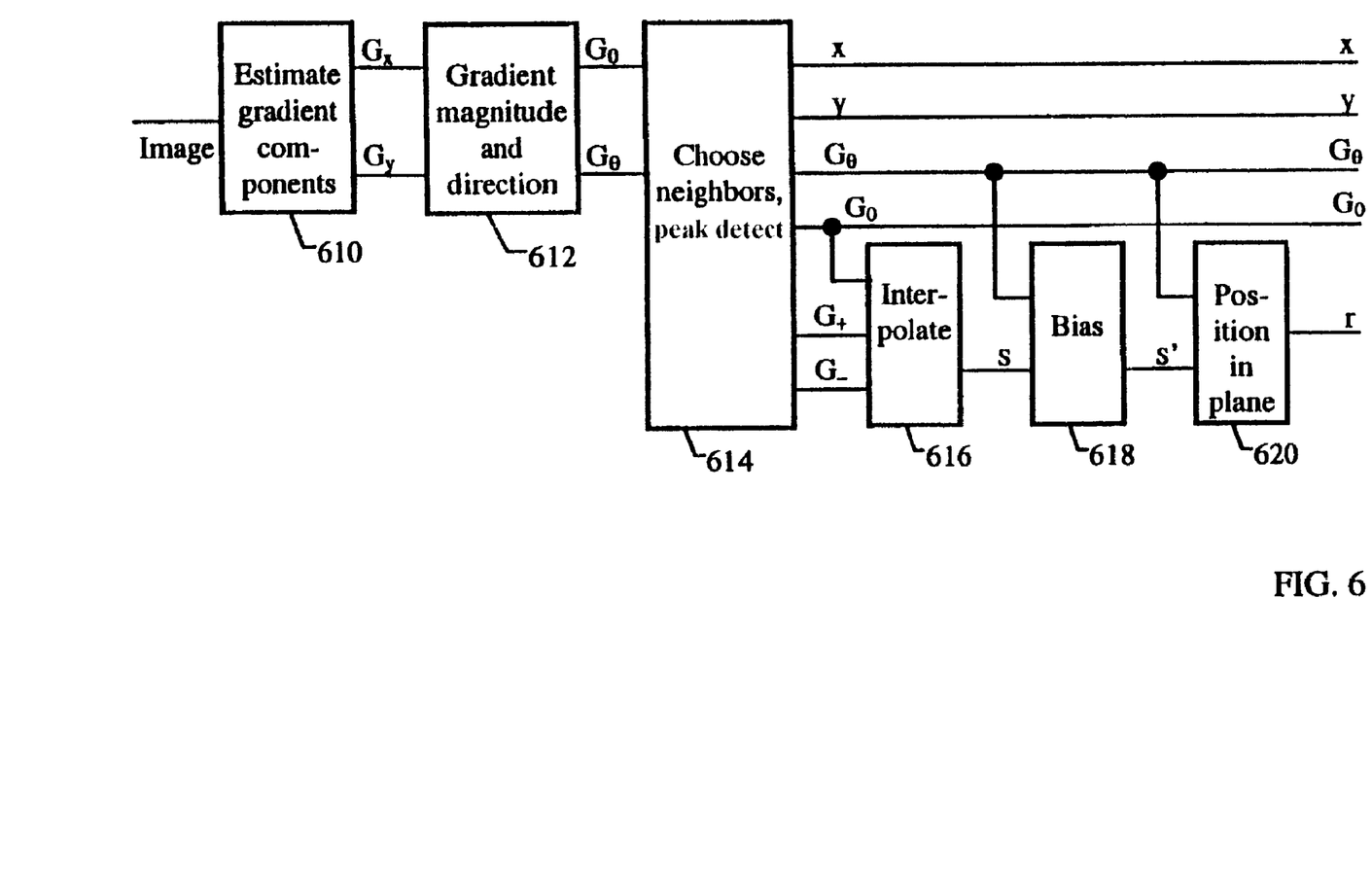
FIG. 6 shows a complete apparatus for subpixel edge detection according to the invention.

A FIG. 6 shows a complete embodiment of an apparatus according to the invention. A digital image is input to gradient component estimation element 610, the element 610 being based upon convolution kernels of FIG. 1, for example, and producing gradient component outputs $G_x$ and $G_y$ for every point of a regularly spaced grid. For each grid point, a gradient component output $G_x$ and $G_y$ is input to a Cartesian-to-polar element 612, based on the methods of FIG. 2, for example, thereby producing a gradient magnitude estimate $G_0$ and a gradient direction estimate $G_\theta$ at the grid point. The gradient magnitude and direction estimates $G_0$ and $G_\theta$ are input to element 614, which element chooses neighboring gradient magnitude estimates according to the methods of FIG. 3, for example, detects edges corresponding to gradient magnitude peaks not below a noise threshold, and outputs a list of edges, where each edge includes integer grid position (x,y), gradient magnitude $G_0$ and direction $G_\theta$, and neighboring gradient magnitudes $G_+$ and $G_-$.

For each edge in the list of edges, the gradient magnitude profile including $G_0$, $G_+$, and $G_-$ is input to the interpolation element 616, which outputs edge position s along the profile in arbitrary units according to the methods of FIG. 4a or 4b, for example. The interpolated edge position and gradient direction $G_\theta$ are input to edge position bias element 618, which outputs adjusted edge position s' according to the method of FIG. 5, for example. The adjusted edge position s' and gradient direction $G_\theta$ are input to plane positioning element 620, which outputs the distance r of the edge from $G_0$ in the gradient direction, according to the method of FIG. 4c, for example.

The final output of the apparatus of FIG. 6 is a list of edges, where each edge includes integer grid position (x,y), gradient magnitude $G_0$, direction $G_\theta$, and the distance r of the edge from (x,y) in direction $G_\theta$.

The best mbde for implementing the apparatus of FIG. 6 includes the embodiments of FIGS. 1b, 2c, 3a, 4a, 4c, and 5.

Other modifications and implementations will occur to those skilled in the art without departing from the spirit and the scope of the invention as claimed. Accordingly, the above description is not intended to limit the invention except as indicated in the following claims.

What is claimed is:

1. An apparatus for detection and sub-pixel location of edges in a digital image, said digital image including a plurality of pixel values, each pixel value being associated with a respective pixel point of a regularly-spaced pixel grid, said apparatus comprising:

a gradient estimator for estimating gradient magnitude and gradient direction at a plurality of regularly-spaced gradient points in said digital image, so as to provide a plurality of estimates of gradient magnitude and gradient direction, each said estimate of gradient magnitude and gradient direction being associated with a respective gradient point of a regularly-spaced gradient grid;

a peak detector, cooperative with said gradient estimator, operating such that gradient magnitude associated with each gradient point is used to select a plurality of gradient points that substantially have a local maximum of gradient magnitude in approximately said gradient direction; and a subpixel interpolator, cooperative with said gradient estimator and said peak detector, operating such that gradient direction associated with each gradient point is used to select a respective set of neighboring gradient points, and operating such that said local maximum of gradient magnitude and the gradient magnitudes of the respective set of neighboring gradient points are used to determine an interpolated edge position along a one-dimensional gradient magnitude profile including a gradient point associated with said local maximum of gradient magnitude and each gradient point associated with said respective set of neighboring gradient points.

2. The apparatus of claim 1, further comprising:

a plane positioner, cooperative with said interpolator and said gradient estimator, said plane positioner operating so as to determine a two-dimensional interpolated position of the edge, wherein:

the two-dimensional interpolated position lies along a line that passes through the gradient point associated with said local maximum of gradient magnitude, and that is oriented substantially parallel to the gradient direction of said gradient point, and the direction from said two-dimensional interpolated position to said interpolated edge position is substantially normal to the gradient direction.

3. The apparatus of claim 1, wherein the respective set of neighboring gradient points is selected from east-west, north-south, northeast-southwest, and northwest-southeast neighbors.

4. The apparatus of claim 1, wherein the interpolator uses a parabolic interpolation function to determine said interpolated edge position.

5. The apparatus of claim 1, wherein the respective set of neighboring gradient points is selected from east-west, north-south, northeast-southwest, and northwest-southeast neighbors, and said interpolator uses a parabolic interpolation function to determine said interpolated edge position.

6. The apparatus of claim 1, further including an edge position bias element, cooperative with said interpolator, that operates to adjust an edge position provided by said interpolator.

7. The apparatus of claims 6, wherein said edge position bias element adjusts edge position provided by said interpolator in accordance with gradient direction at each said local maximum of gradient magnitude.

8. The apparatus of claim 1, wherein said gradient estimator includes apparatus for implementing the CORDIC algorithm.

9. The apparatus of claim 1, wherein said gradient estimator includes an orthogonal gradient component estimator for providing orthogonal gradient components, cooperative with a gradient magnitude and gradient direction approximator for using said orthogonal gradient components to provide gradient magnitude and gradient direction approximations.

10. An apparatus for detection and sub-pixel location of edges in a digital image, said digital image including a plurality of pixel values, each pixel value being associated with a respective pixel point of a regularly-spaced pixel grid, said apparatus comprising:

gradient estimation means for estimating gradient magnitude and gradient direction at a plurality of regularly-spaced gradient points in said digital image, so as to provide a plurality of estimates of gradient magnitude and gradient direction, each said estimate of gradient magnitude and gradient direction being associated with a respective gradient point of a regularly-spaced gradient grid;

peak detection means, cooperative with said gradient estimation means, for using gradient magnitude associated with each gradient point to select a plurality of gradient points that substantially have a local maximum of gradient magnitude in approximately said gradient direction; and subpixel interpolation means, cooperative with said gradient estimation means and said peak detection means, for using gradient direction associated with each gradient point to select a respective set of neighboring gradient points, and for using said local maximum of gradient magnitude and the gradient magnitudes of the respective set of neighboring gradient points to determine an interpolated edge position along a one-dimensional gradient magnitude profile including a gradient point associated with said local maximum of gradient magnitude and each gradient point associated with said respective set of neighboring gradient points.

11. The apparatus of claimed 10 further comprising:

plane position means, cooperative with said interpolation means and said gradient estimation means, said plane position means for determining a two-dimensional interpolated position of the edge, wherein:
the two-dimensional interpolated position lies along a line that passes through the gradient point associated with said local maximum of gradient magnitude, and that is oriented substantially parallel to the gradient direction of said gradient point, and
the direction from said two-dimensional interpolated position to said interpolated edge position is substantially normal to the gradient direction.

12. The apparatus of claim 10, wherein the respective set of neighboring gradient points is selected from east-west, north-south, northeast-southwest, and northwest southeast neighbors.

13. The apparatus of claim 10, wherein the interpolation means uses a parabolic interpolation function to determine said interpolated edge position.

14. The apparatus of claim 10, wherein the respective set of neighboring gradient points is selected from east-west, north-south, northeast-southwest, and northwest-southeast neighbors, and said interpolation means uses a parabolic interpolation function to determine said interpolated edge position.

15. The apparatus of claim 10, further including edge position bias means, cooperative with said interpolation means, for adjusting an edge position provided by said interpolation means.

16. The apparatus of claim 15, wherein said edge position bias means adjusts edge position provided by said interpolation means in accordance with gradient direction at each said local maximum of gradient magnitude.

17. The apparatus of claim 10, wherein said gradient estimation means includes CORDIC algorithm means.

18. The apparatus of claim 10, wherein said gradient estimation means includes orthogonal gradient component estimation means for providing orthogonal gradient components, cooperative with gradient magnitude and gradient direction approximation means for using said orthogonal gradient components to provide gradient magnitude and gradient direction approximations.

19. A method for detection and sub-pixel location of edges in a digital image, said digital image including a plurality of pixel values, each pixel value being associated with a respective pixel point of a regularly-spaced pixel grid, the method comprising the steps of:

estimating gradient magnitude and gradient direction at a plurality of regularly-spaced gradient points in said digital image, so as to provide a plurality of estimates of gradient magnitude and gradient direction, each said estimate of gradient magnitude and gradient direction being associated with a respective gradient point of a regularly-spaced gradient grid;

using gradient magnitude associated with each gradient point to select a plurality of gradient points that substantially have a local maximum of gradient magnitude in approximately said gradient direction;

using gradient direction associated with each gradient point to select a respective set of neighboring gradient points; and using said local maximum of gradient magnitude and the gradient magnitudes of the respective set of neighboring gradient points to determine a subpixel interpolated edge position along a one-dimensional gradient magnitude profile including a gradient point associated with said local maximum of gradient magnitude and each gradient point associated with said respective set of neighboring gradient points.

20. The method of claim 19, further comprising the steps of:

determining a two-dimensional interpolated position of the edge, wherein:
the two-dimensional interpolated position lies along a line that passes through the gradient point associated with said local maximum of gradient magnitude, and that is oriented substantially parallel to the gradient direction of said gradient point, and the direction from said two-dimensional interpolated position to said interpolated edge position is substantially normal to the gradient direction.

21. The method of claim 19, wherein the respective set of neighboring gradient points is selected from east-west, north-south, northeast-southwest, and northwest-southeast neighbors.

22. The method of claim 19, wherein a parabolic interpolation function is used to determine said interpolated edge position.

23. The method of claim 19, wherein the respective set of neighboring gradient points is selected from east-west, north-south, northeast-southwest, and northwest-southeast neighbors, and said interpolated edge position is determined using a parabolic interpolation function.

24. The method of claim 19, further including the step of:
adjusting the interpolated edge position in accordance with a power law curve.

25. The method of claim 19, further including the step of:
adjusting edge position in accordance with gradient direction at each said local maximum of gradient magnitude.

26. The method of claim 19 wherein the step of estimating gradient magnitude and gradient direction includes a CORDIC algorithm.

27. A method for detection and sub-pixel location of edges in a digital image, said digital image including a plurality of pixel values, each pixel value being associated with a respective pixel point of a regularly-spaced pixel grid, the method comprising the steps of:

estimating gradient magnitude and gradient direction at a plurality of gradient points in said digital image;

using gradient magnitude associated with each gradient point to select a plurality of gradient points that substantially have a local maximum of gradient magnitude;

using gradient direction associated with each gradient point to select a respective set of neighboring gradient points;

using said local maximum of gradient magnitude and the gradient magnitudes of the selected respective set of neighboring gradient points to determine a subpixel interpolated edge position; and determining a two-dimensional position of the edge, wherein:

the two-dimensional interpolated position lies along a line that passes through the gradient point associated with said local maximum of gradient magnitude, and that is oriented substantially parallel to the gradient direction of said gradient point; and the direction from said two-dimensional interpolated position to said interpolated edge position is substantially normal to the gradient direction.

28. The method of claim 27, wherein the respective set of neighboring gradient points is selected from east-west, north-south, northeast-southwest, and northwest-southeast neighbors.

29. The method of claim 27, wherein a parabolic interpolation function is used to determine said interpolated edge position.

30. The method of claim 27, wherein the respective set of neighboring gradient points is selected from east-west, north-south, northeast-southwest, and northwest-southeast neighbors, and said interpolated edge position is determined using a parabolic interpolation function.

31. The method of claim 27, further including the step of:
adjusting the interpolated edge position in accordance with a power law curve.

32. The method of claim 27, further including the step of:
adjusting edge position in accordance with gradient direction at each said local maximum of gradient magnitude.

33. The method of claim 27 wherein the step of estimating gradient magnitude and gradient direction includes a CORDIC algorithm.

* * * * *